United States Patent
Kijima et al.

[11] Patent Number: 5,897,956
[45] Date of Patent: *Apr. 27, 1999

[54] GLASS HAVING LOW SOLAR RADIATION AND ULTRAVIOLET RAY TRANSMITTANCE

[75] Inventors: Takashi Kijima; Toru Kudo; Mizuki Ito; Fumio Kamei; Akira Kondo, all of Yokohama, Japan

[73] Assignee: Asahi Glass Company Ltd., Tokyo, Japan

[*] Notice: This patent is subject to a terminal disclaimer.

[21] Appl. No.: 08/845,034

[22] Filed: Apr. 21, 1997

Related U.S. Application Data

[63] Continuation of application No. 08/393,581, Feb. 10, 1995, abandoned.

[30] Foreign Application Priority Data

Oct. 26, 1994 [JP] Japan .................................... 6-262866

[51] Int. Cl.$^6$ .................................................. B32B 17/00
[52] U.S. Cl. .......................... 428/426; 428/220; 428/428; 501/55; 501/64; 501/68; 501/69; 501/70; 501/71; 501/72
[58] Field of Search .................................... 428/426, 428, 428/220; 501/55, 64, 68, 69, 70, 71, 72

[56] References Cited

U.S. PATENT DOCUMENTS

| | | | |
|---|---|---|---|
| Re. 34,639 | 6/1994 | Boulos et al. | 501/71 |
| Re. 34,760 | 10/1994 | Boulos et al. | 501/71 |
| 3,300,323 | 1/1967 | Plumat et al. | 106/52 |
| 3,858,964 | 1/1975 | Piesslinger et al. | 350/96 B |
| 4,095,986 | 6/1978 | Matsuda et al. | 106/52 |
| 4,104,076 | 8/1978 | Pons | 106/52 |
| 4,192,689 | 3/1980 | Rinehart | 106/52 |
| 4,203,746 | 8/1978 | Battigelli et al. | 65/6 |
| 4,270,945 | 6/1981 | Amrhein et al. | 65/99 A |
| 4,312,953 | 1/1982 | Mills et al. | 501/71 |
| 4,339,541 | 7/1982 | Dela Ruye | 501/71 |
| 4,366,252 | 12/1982 | Weaver | 501/60 |
| 4,376,829 | 3/1983 | Daiku | 501/64 |
| 4,396,722 | 8/1983 | Rapp | 501/35 |
| 4,525,462 | 6/1985 | Behr | 501/71 |
| 4,701,425 | 10/1987 | Baker et al. | 501/70 |
| 4,713,359 | 12/1987 | Lubelski et al. | 501/63 |
| 4,738,938 | 4/1988 | Kunkle et al. | 501/72 |
| 4,792,536 | 12/1988 | Pecoraro | 501/70 |
| 4,866,010 | 9/1989 | Boulos et al. | 501/71 |
| 4,873,206 | 10/1989 | Jones | 501/71 |
| 4,944,984 | 7/1990 | Kunert | 428/83 |

(List continued on next page.)

FOREIGN PATENT DOCUMENTS

| | | |
|---|---|---|
| 2109059 | 5/1994 | Canada . |
| 2390-390 | 1/1979 | France . |
| 2463-108 | 3/1981 | France . |
| 2 672 587 | 8/1992 | France . |
| 2 690 437 | 10/1993 | France . |
| 3220-072-A | 12/1932 | Germany . |
| 25 09 187 | 3/1974 | Germany . |
| 220-592 | 4/1985 | Germany . |
| 3009-805 | 1/1978 | Japan . |
| 53-045-315 | 4/1978 | Japan . |
| 60-215-546-A | 10/1985 | Japan . |
| 61-136-936-A | 6/1986 | Japan . |
| 6-56466 | 3/1994 | Japan . |
| 443-004 | 3/1975 | U.S.S.R. . |
| 459-437 | 4/1975 | U.S.S.R. . |
| 449-890 | 7/1975 | U.S.S.R. . |
| 471-315 | 10/1975 | U.S.S.R. . |
| 631-473 | 11/1975 | U.S.S.R. . |
| 504-715 | 6/1976 | U.S.S.R. . |
| 511-301 | 9/1976 | U.S.S.R. . |
| 528-271 | 10/1976 | U.S.S.R. . |
| 536-132 | 2/1977 | U.S.S.R. . |
| 547-399 | 7/1977 | U.S.S.R. . |
| 557-060 | 7/1977 | U.S.S.R. . |
| 579-239 | 11/1977 | U.S.S.R. . |
| 579-240 | 11/1977 | U.S.S.R. . |
| 594-065 | 2/1978 | U.S.S.R. . |
| 612-905 | 6/1978 | U.S.S.R. . |
| 614-037 | 6/1978 | U.S.S.R. . |
| 632-661 | 11/1978 | U.S.S.R. . |
| 709-575 | 1/1980 | U.S.S.R. . |
| 753-802 | 8/1980 | U.S.S.R. . |
| 895-943 | 1/1981 | U.S.S.R. . |
| 821-426 | 4/1981 | U.S.S.R. . |
| 952-788-A | 8/1982 | U.S.S.R. . |
| 1106-794-A | 8/1984 | U.S.S.R. . |
| WO 91/07356 | 5/1991 | WIPO . |

OTHER PUBLICATIONS

European Search Report Dated Jan. 12, 1996.
Database WPI Section CH, Week 9250 Abstract (JP 4310539—Nov. 2, 1992).
Glass Digest, "Auto Glass News", Feb. 15—p. 24.
Glass Digest, "News About Auto Glass", Jul. 15, 1993—pp. 24–25.
Glass Digest, "Three Factors Which Most Affect the Future of Vehicle Glass", Aug. 15, 1993—pp. 108–112.
Glass Digest, "News About Auto Glass", Sep. 15, 1993—p. 26.
Glass Digest, "News About Auto Glass", Dec. 15, 1993—p. 22.
Glass Digest, "News About Auto Glass", Oct. 15, 1993—pp. 23–24.
American Glass Review, Jan. 1990—pp. 4–5.
Libby–Owens–Ford News, "LOF Introduces a Bold New Step in Solar Privacy Glass", pp. 1–3.

Primary Examiner—Timothy Speer
Attorney, Agent, or Firm—Oblon, Spivak, McClelland, Maier & Neustadt, P.C.

[57] ABSTRACT

Glass having low solar radiation and ultraviolet ray transmittance, which consists essentially of a soda limesilica type matrix glass containing from 0.53 to 0.70 wt % of total iron calculated as $Fe_2O_3$, from 0.2 to 0.4 wt % of $TiO_2$ and from 0.5 to 0.8 wt % of total cerium calculated as $CeO_2$, wherein the weight of FeO calculated as $Fe_2O_3$ is from 30 to 40% of the weight of the total iron calculated as $Fe_2O_3$.

14 Claims, No Drawings

U.S. PATENT DOCUMENTS

| | | | |
|---|---|---|---|
| 4,998,784 | 3/1991 | Freeman et al. | 350/3.7 |
| 5,013,487 | 5/1991 | Cheng | 252/587 |
| 5,023,210 | 6/1991 | Kruwiede et al. | 501/71 |
| 5,069,826 | 12/1991 | Cheng | 252/587 |
| 5,070,048 | 12/1991 | Boulos et al. | 501/71 |
| 5,071,796 | 12/1991 | Jones | 501/70 |
| 5,077,133 | 12/1991 | Cheng . | |
| 5,077,240 | 12/1991 | Hayden et al. | 501/67 |
| 5,089,444 | 2/1992 | Hattori et al. | 501/9 |
| 5,112,778 | 5/1992 | Cheng et al. | 501/31 |
| 5,120,584 | 6/1992 | Ohlenforst et al. | 428/34 |
| 5,121,748 | 6/1992 | Ditz et al. | 128/631 |
| 5,213,828 | 5/1993 | Winter et al. | 428/46 |
| 5,214,008 | 5/1993 | Beckwith et al. | 501/69 |
| 5,215,944 | 6/1993 | Jones | 501/64 |
| 5,240,886 | 8/1993 | Gulotta et al. . | |
| 5,250,098 | 10/1993 | Platts | 65/30.1 |
| 5,256,607 | 10/1993 | Kerko et al. | 501/65 |
| 5,261,718 | 11/1993 | Ohlenforst et al. | 296/96.21 |
| 5,264,400 | 11/1993 | Nakaguchi et al. | 501/71 |
| 5,268,335 | 12/1993 | Kerko et al. | 501/66 |
| 5,278,108 | 1/1994 | Cheng et al. | 501/71 |
| 5,278,805 | 1/1994 | Kimball | 367/32 |
| 5,296,294 | 3/1994 | Suzuki | 428/410 |
| 5,308,805 | 5/1994 | Baker | 501/71 |
| 5,316,854 | 5/1994 | Lin et al. | 428/426 |
| 5,318,931 | 6/1994 | Nakagvchi | 501/64 |
| 5,320,986 | 6/1994 | Taniguchi et al. | 501/70 |
| 5,328,768 | 7/1994 | Goodwin | 428/428 |
| 5,344,798 | 9/1994 | Morimoto | 501/70 |
| 5,346,864 | 9/1994 | Maugendre et al. | 501/35 |
| 5,346,867 | 9/1994 | Jones et al. | 501/71 |
| 5,352,640 | 10/1994 | Combes et al. | 501/71 |
| 5,362,689 | 11/1994 | Morimoto et al. | 501/70 |
| 5,364,820 | 11/1994 | Morimoto et al. | 501/71 |
| 5,366,940 | 11/1994 | Bolton et al. | 501/69 |
| 5,372,977 | 12/1994 | Mazon-Ramos et al. | 501/57 |
| 5,380,685 | 1/1995 | Morimoto et al. | 501/71 |
| 5,385,872 | 1/1995 | Gulotta | 501/71 |
| 5,393,593 | 2/1995 | Gulotta et al. | 428/220 |
| 5,403,664 | 4/1995 | Kurahashi et al. | 428/426 |
| 5,403,789 | 4/1995 | Kerko et al. | 501/65 |
| 5,405,811 | 4/1995 | Kerko et al. | 501/66 |
| 5,411,922 | 5/1995 | Jones | 501/71 |
| 5,438,024 | 8/1995 | Bolton et al. | 501/55 |
| 5,446,007 | 8/1995 | Krashkevich et al. | 501/64 |
| 5,723,390 | 3/1998 | Kijima | 501/70 |

GLASS HAVING LOW SOLAR RADIATION AND ULTRAVIOLET RAY TRANSMITTANCE

This application is a Continuation of application Ser. No. 08/393,581, filed on Feb. 10, 1995, now abandoned.

BACKGROUND OF THE INVENTION

Field of the Invention

The present invention relates to glass having low transmittance of solar radiation and ultraviolet ray.

Discussion of Background

As glass for vehicles having reduced solar radiation transmittance (see JIS R3106) and ultraviolet ray transmittance (see ISO 9050), U.S. Pat. No. 4,792,536 discloses soda lime-silica type glass wherein the weight of FeO calculated as $Fe_2O_3$ is made at least 45% of the weight of the total iron calculated as $Fe_2O_3$. This glass has a bluish color.

With this glass, Glauber's salt used as a refining agent does not provide a refining function, since the weight of FeO calculated as $Fe_2O_3$ is at least 45% of the weight of the total iron calculated as $Fe_2O_3$. Accordingly, molten glass is required to be maintained under reduced pressure for fining, which makes the melting step of glass cumbersome.

Further, soda lime-silica type glass containing at least 0.51 wt % of $Fe_2O_3$, is known. This glass has a greenish color.

As such glass, for example, the following glass is disclosed in U.S. Pat. No. 5,077,133. Namely, it has a thickness of 3 mm and contains from 0.68 to 0.92 wt % of total iron, from 0.5 to 1.2 wt % of $CeO_2$ and from 0.02 to 0.85 wt % of $TiO_2$, wherein the amount of bivalent iron in the total iron is from 23 to 29 wt %. Another one has a thickness of 4 mm and contains from 0.61 to 0.86 wt % of total iron, from 0.3 to 0.75 wt % of $CeO_2$ and from 0.02 to 0.45 wt % of $TiO_2$, wherein the amount of bivalent iron in the total iron is from 23 to 29 wt %.

However, such glass has a large specific gravity, since its iron content is large. Accordingly, when such glass is prepared and then subjected to change of the composition to prepare usual soda lime-silica type glass, there have been problems that glass containing a large amount of iron tends to remain in the melting furnace, it takes a long time for the change of the composition, and the productivity tends to be low. Further, if the iron content is large, in the melting step, the heat tends to be absorbed at the surface and hardly reach the interior, whereby there has been a problem that refining tends to be difficult.

Further, if the amount of $CeO_2$ is increased in order to improve the ultraviolet absorption, the increase of the specific gravity becomes more serious. Accordingly, it is difficult to substantially increase the amount of $CeO_2$, whereby it is difficult to obtain a product which has fully satisfactory ultraviolet absorption.

SUMMARY OF THE INVENTION

It is an object of the present invention to solve such problems and to provide glass having low solar radiation and ultraviolet ray transmittance and high visible light transmittance (see JIS R3106) and whereby the change of the composition can be carried out in a short period of time, the productivity will not be lowered, and it will be unnecessary to maintain the molten glass under reduced pressure for fining.

Another object of the present invention is to provide glass having a visible light transmittance of at least 70% and low solar radiation transmittance and having substantially reduced ultraviolet ray transmittance, particularly transmittance at a wavelength of 370 nm.

A first embodiment of the present invention provides glass having low solar radiation and ultraviolet ray transmittance, which consists essentially of a soda lime-silica type matrix glass containing from 0.53 to 0.70 wt % of total iron calculated as $Fe_2O_3$, from 0.2 to 0.4 wt % of $TiO_2$ and from 0.4 to 0.8 wt % of total cerium calculated as $CeO_2$, wherein the weight of FeO calculated as $Fe_2O_3$ is from 30 to 40% of the weight of the total iron calculated as $Fe_2O_3$.

With such glass, the change of the composition can be carried out in a short period of time, the productivity will not be lowered, it is not required to maintain molten glass under reduced pressure for fining, and glass having high visible light transmittance (see JIS R3106) and low solar radiation and ultraviolet ray transmittance, will be provided.

In the first embodiment of the present invention, the total iron comprises $Fe_2O_3$ which serves mainly to lower the ultraviolet ray transmittance and FeO which serves mainly to lower the solar radiation transmittance. If the content of the total iron calculated as $Fe_2O_3$ is too small, at least one of such transmittances will be too high, whereby the desired performance will be inadequate. On the other hand, if it is too large, the specific gravity of the glass will be too high, whereby the above-mentioned change of the composition of glass will require a long period of time, and the productivity will be low.

The ratio of the weight of FeO calculated as $Fe_2O_3$ to the weight of the total iron calculated as $Fe_2O3$, i.e. the ratio of bivalent iron to the total iron, is important in the glass of the present invention. If the ratio is too small, the FeO content will be small, whereby the solar radiation transmittance will be too high. On the other hand, if this ratio is too high, Glauber's salt as a refining agent will not substantially provide a fining function. Accordingly, unless the molten glass is maintained under reduced pressure for fining, a substantial amount of seeds will remain in glass, and it is practically difficult to obtain a satisfactory commercial product.

Specifically, FeO is preferably contained in an amount of from 0.16 to 0.24 wt % in the glass.

On the other hand, $Fe_2O_3$ is a component which serves mainly to reduce the ultraviolet ray transmittance. If the $Fe_2O_3$ content is too small, the ultraviolet ray transmittance will be too high, such being undesirable. On the other hand, if it is too large, it takes a long time for the change of the composition, and the productivity will be low. Specifically, $Fe_2O_3$ is preferably contained in an amount of from 0.35 to 0.49 wt % in the glass.

$TiO_2$ is a component which serves mainly to reduce the ultraviolet ray transmittance. If the $TiO_2$ content is small, the ultraviolet ray transmittance tends to be too high, and if it is too large, the visible light transmittance will be low.

Cerium is a component which serves mainly to reduce the ultraviolet ray transmittance. Cerium may be trivalent or tetravalent. If the content of total cerium calculated as $CeO_2$ is too small, the ultraviolet transmittance will be too high, and if it is too large, cords or ream are likely to form in the glass at the time of the change of the composition.

The soda lime-silica type glass can be commonly used for vehicles or architectural use. Thus, one of preferred glass compositions of the present invention is as follows:

| | |
|---|---|
| SiO$_2$ | 68–74 wt % |
| Al$_2$O$_3$ | 0.5–3 wt % |
| MgO | 3–6 wt % |
| CaO | 6–10 wt % |
| Na$_2$O + K$_2$O | 10–16 wt % |
| SO$_3$ | 0–1 wt % |
| Total iron calculated as Fe$_2$O$_3$ | 0.53–0.70 wt % |
| Fe$_2$O$_3$ | 0.35–0.49 wt % |
| FeO | 0.16–0.24 wt % |
| TiO$_2$ | 0.2–0.4 wt % |
| Total cerium calculated as CeO$_2$ | 0.5–0.8 wt % |

If the SiO$_2$ content is small, the weathering resistance tends to be low, and if it is large, devitrification is likely to result. If the Al$_2$O$_3$ content is small, the water resistance tends to be low, and if it is large, the meltability tends to be low.

Na$_2$O and K$_2$O are components which serve to promote melting of raw materials. If their total amount is small, such an effect tends to be small, and if it is large, the weathering resistance tends to be poor.

CaO and MgO are components which serve to promote meltability of the raw materials and improve the weathering resistance. If their content is small, such effects tend to be small, and if it is large, devitrification is likely to occur.

SO$_3$ is used as a refining agent. If it is too large, a gas component of SO$_2$ is likely to remain in the form of bubbles in the glass.

In the present invention, with a view to improving the efficiency for the change of the composition, the specific gravity of the glass is preferably adjusted within a range of from 2.49 to 2.53, more preferably from 2.51 to 2.52, as usual soda lime-silica type glass has a specific gravity of from 2.49 to 2.52.

The specific gravity can be adjusted by controlling the composition of the matrix glass. Specifically, the weight ratio of SiO$_2$/(MgO+CaO) is adjusted to a level of from 5.0 to 9.0, preferably from 5.4 to 6.6, more preferably from 5.8 to 6.6, most preferably from 6.0 to 6.6.

The glass of the present invention having low solar radiation transmittance and ultraviolet ray transmittance, preferably has a thickness of from 1.7 to 7 mm. If the thickness is less than 1.7 mm, the solar radiation transmittance and the ultraviolet ray transmittance tend to be too high, such being undesirable. On the other hand, if the thickness exceeds 7 mm, the visible light transmittance tends to be too low, and heat cracks are likely to occur upon absorption of solar radiation.

In a case where the glass of the present invention having low solar radiation and ultraviolet ray transmittance is to be used for buildings, it preferably has a thickness of from 1.7 to 7 mm. On the other hand, when it is to be used for vehicles, it preferably has a thickness of from 1.7 to 5 mm. When it is used as glass for vehicles, if the thickness exceeds 5 mm, the visible light transmittance tends to be too low, and the weight would be too heavy. In the glass of the present invention having low solar radiation and ultraviolet ray transmittance, the total iron calculated as Fe$_2$O$_3$ and the contents of Fe$_2$O$_3$ and FeO are particularly preferably within the ranges as disclosed in Table 1 within the above-mentioned ranges depending upon the thickness. In Table 1, the one having a thickness of from 1.7 to 2.6 mm is preferably used so that sheets of such glass having low solar radiation and ultraviolet ray transmittance according to the present invention are laminated to obtain laminated glass having lower solar radiation and ultraviolet ray transmittance for vehicles. Such laminated glass, when usual polyvinyl butyral is used as an interlayer, will have low solar radiation and ultraviolet ray transmittance and have a visible light transmittance of at least 70%, which is particularly suitable for glass for vehicles such as windshield glass.

TABLE 1

| Thickness (mm) | From 1.7 to 2.6 | More than 2.6 and not more than 3.6 | More than 3.6 and not more than 4.0 | More than 4.0 and not more than 7.0 |
|---|---|---|---|---|
| Total iron calculated as Fe$_2$O$_3$ (wt %) | 0.53–0.65 | 0.60–0.70 | 0.55–0.67 | 0.53–0.65 |
| Fe$_2$O$_3$ (wt %) | 0.35–0.44 | 0.39–0.50 | 0.37–0.46 | 0.35–0.44 |
| FeO (wt %) | 0.16–0.21 | 0.18–0.24 | 0.18–0.22 | 0.16–0.21 |

Specifically, the glass of the present invention having low solar radiation and ultraviolet ray transmittance has the following characteristics. Namely, the visible light transmittance is high enough with a thickness of 4 mm, the visible light transmittance is at least 70%. The solar radiation transmittance is very low such that with a thickness of 4 mm, the solar radiation transmittance is not higher than 50%. Further, the ultraviolet ray transmittance is low such that with a thickness of 4 mm, the ultraviolet ray transmittance is not higher than 18% as measured in accordance with ISO 9050. The dominant wavelength for transmittance is from 500 to 515 nm, and the glass has a greenish color.

The glass of the present invention having low solar radiation and ultraviolet ray transmittance can be used as single sheet glass, laminated glass or double glazing unit panes. In the case of laminated glass or double glazing unit, glass sheets of the present invention may be used for the both sides of the laminated glass or the double glazing unit. Otherwise, the glass of the present invention may be used in combination with other kinds of glass to form the laminated glass or the double glazing unit.

In recent years, there has been an increasing demand for glass having the ultraviolet ray absorption further improved, particularly for automotive use. The second embodiment of the present invention is to satisfy such a demand and provides glass having low solar radiation and ultraviolet ray transmittance, which consists essentially of a soda lime-silica type glass containing from 0.52 to 0.67 wt % of total iron calculated as Fe$_2$O$_3$, from 0.2 to 0.6 wt % of TiO$_2$ and from 0.8 to 2.0 wt % of total cerium calculated as CeO$_2$, wherein the weight of FeO calculated as Fe$_2$O$_3$ is from 28 to 38% of the weight of the total iron calculated as Fe$_2$O$_3$.

If the content of the total iron calculated as Fe$_2$O$_3$ is small, the solar radiation transmittance and the ultraviolet ray transmittance tend to be too high, and if it is large, the visible light transmittance tends to be too small. The content of the total iron is preferably at most 0.64 wt %, more preferably at most 0.63 wt %. If the amount of bivalent iron in this total iron is small, the solar radiation transmittance tends to be too high, and if it is large, the melting step of glass tends to be cumbersome, and the glass tends to have a bluish color.

If the $CeO_2$ content is too large, the costs for the raw material will be high, and it will require a long time to change the composition at the time of producing glass, whereby the productivity will be low. Further, the glass tends to have a yellowish color.

If the $TiO_2$ content is too small, the ultraviolet ray transmittance tends to be too high, and if it is large, the visible light transmittance tends to be too small, and the glass tends to have a yellowish color.

To keep the ultraviolet ray transmittance at a low level, in the second embodiment of the present invention, $CeO_2 + TiO_2$ is preferably from 1.2 to 2.3 wt %.

CoO is not an essential component. However, by incorporating it in a very small amount, the color of glass which tends to be yellowish by $CeO_2$ and $TiO_2$, can be adjusted to a green color. It is preferably contained in an amount of at least 0.0002 wt %.

If its content is too large, the visible light transmittance will be too small.

Among various components, the contents of the total iron and $CeO_2$ are preferably adjusted as follows depending upon the thickness of the glass. Namely, when the thickness is from 1.7 to 4.3 mm, the content of the total iron calculated as $Fe_2O_3$ is preferably from 0.59 to 0.64 wt %, and at the same time, the content of $CeO_2$ is preferably from 1.2 to 2.0 wt %. Likewise, when the thickness is from 4.4 to 5.5 mm, the content of the total iron calculated as $Fe_2O_3$ is preferably from 0.52 to 0.63 wt %, and at the same time, the content of $CeO_2$ is preferably from 0.8 to 1.2 wt %.

Thus, in the second embodiment of the present invention, a preferred glass composition is as follows.

| | |
|---|---|
| $SiO_2$ | 68–74 wt % |
| $Al_2O_3$ | 0.5–3 wt % |
| MgO | 3–6 wt % |
| CaO | 6–10 wt % |
| $Na_2O + K_2O$ | 10–16 wt % |
| $SO_3$ | 0.05–1 wt % |
| Total iron calculated as $Fe_2O_3$ | 0.52–0.67 wt % |
| $Fe_2O_3$ | 0.35–0.50 wt % |
| FeO | 0.16–0.24 wt % |
| $TiO_2$ | 0.2–0.6 wt % |
| Total cerium calculated as $CeO_2$ | 0.8–2 wt % |

If the content of the $SO_3$ is small, the refining effect tends to be low.

Also in the second embodiment of the present invention as in the case of the first embodiment, the specific gravity of the glass is adjusted preferably to a level of from 2.49 to 2.53, more preferably from 2.51 to 2.52, in conformity with usual soda lime-silica type glass, with a view to improving the efficiency for the change of the composition.

The specific gravity can be adjusted in the same manner as in the first embodiment by controlling the composition of the matrix glass. Specifically, the weight ratio of $SiO_2/(MgO+CaO)$ is adjusted to a level of from 5.0 to 7.0, preferably from 5.4 to 6.6, more preferably from 6.0 to 6.6, most preferably from 6.2 to 6.6.

The ultraviolet ray absorbent glass in the second embodiment of the present invention has a dominant wavelength of from 500 to 540 nm, particularly from 515 to 535 nm, for transmittance, and with a thickness of 3.5 mm, a solar radiation transmittance of from 45 to 52%, a visible light transmittance of at least 70%, an ultraviolet ray transmittance of not higher than 10%, a transmittance of a wavelength at 370 nm of not more than 30%, and an excitation purity of from 2 to 3%.

The glass of the present invention having low solar radiation and ultraviolet ray transmittance can be prepared, for example, as follows. Namely, various raw materials are mixed so that the desired glass composition would be obtained. With respect to the raw materials useful for this purpose, iron powder or red iron oxide may, for example, be used as the FeO and $Fe_2O_3$ source; cerium oxide, cerium carbonate or cerium hydroxide may, for example, be used as the cerium source; and titanium oxide may, for example, be used as the titanium source. As the raw materials for the matrix glass, those commonly used may be employed. Further, it is preferred to add a reducing agent such as carbon to these raw materials, so that iron in the molten glass is prevented from being oxidized to $Fe_2O_3$, and FeO will be contained in a predetermined amount.

The glass batch thus adjusted is continuously supplied to a melting furnace, and heated and melted at a temperature of about 1,500° C. by e.g. heavy oil for vitrification. Then, this molten glass is refined and formed into a sheet glass having a predetermined thickness by e.g. a float process. Then, this sheet glass is cut into a predetermined shape to obtain the glass of the present invention having low solar radiation and ultraviolet ray transmittance. Further, the cut glass may be subjected to toughening, laminating or composing into double glazing unit.

Now, the present invention will be described in further detail with reference to Examples. However, it should be understood that the present invention is by no means restricted to such specific Examples.

EXAMPLE 1

A starting material was formulated by using red iron oxide red as the iron source, cerium oxide as the cerium source and titanium oxide as the titanium source and using raw materials for usual soda lime-silica glass as the source for matrix glass. In this formulation, carbon was incorporated in an amount of 0.1 wt %. Then, this glass batch was continuously supplied to a melting furnace and heated and melted at about 1,500° C. by heavy oil in accordance with a conventional method for vitrification. Then, this molten glass was refined under atmospheric pressure and then formed into a sheet glass having a thickness of 4 mm by a float process. Then, this sheet glass was cut into a predetermined shape. The composition of the matrix glass component of this sheet glass was as follows: $SiO_2$ 72.2 wt %, $Al_2O_3$ 1.8 wt %, MgO 3.6 wt %, CaO 7.5 wt %, $Na_2O$ 12.7 wt %, $K_2O$ 0.6 wt % and $SO_3$ 0.1 wt %. Further, in the composition of this sheet glass, the total iron calculated as $Fe_2O_3$, $Fe_2O_3$, FeO, $TiO_2$, the total cerium calculated as $CeO_2$ (unit: wt % in each case), and the ratio of the weight of FeO calculated as $Fe_2O_3$ to the weight of the total iron calculated as $Fe_2O_3$ (in Table 2, represented simply by FeO weight/total iron weight, unit: %) were as shown in Table 2. On the other hand, the optical properties of this sheet glass and bubbles were as shown also in Table 2.

TABLE 2

| | Examples | | | | | | |
|---|---|---|---|---|---|---|---|
| | 1 | 2 | 3 | 4 | 5 | 6 | 7 |
| Thickness (mm) | 4 | 2 | 3.5 | 4.5 | 5 | 4 | 5 |
| Total iron calculated as $Fe_2O_3$ | 0.64 | 0.59 | 0.70 | 0.54 | 0.50 | 0.76 | 0.60 |
| $Fe_2O_3$ | 0.42 | 0.40 | 0.43 | 0.36 | 0.27 | 0.57 | 0.40 |
| FeO | 0.20 | 0.18 | 0.24 | 0.16 | 0.21 | 0.18 | 0.18 |
| $TiO_2$ | 0.32 | 0.29 | 0.44 | 0.27 | 0.02 | 0.05 | 0.28 |
| Total cerium calculated as $CeO_2$ | 0.54 | 0.57 | 0.75 | 0.50 | 0.48 | 0.75 | 0.47 |
| FeO weight/Total iron weight | 35 | 33 | 38 | 33 | 48 | 25 | 33 |
| Visible light transmittance (%) | 73.3 | 83.0 | 70.9 | 70.5 | 71.4 | 72.3 | 71.2 |
| Solar radiation transmittance (%) | 45.4 | 67.7 | 44.0 | 46.3 | 41.3 | 44.9 | 43.1 |
| Ultraviolet ray transmittance (%) | 15.2 | 42.7 | 16.5 | 17.6 | 21.5 | 14.2 | 11.9 |
| Dominant wavelength (nm) | 506.0 | 504.6 | 503.2 | 506.2 | 489.7 | 502.0 | 506.1 |
| Excitation purity (%) | 2.6 | 1.2 | 3.3 | 2.2 | 7.8 | 3.0 | 2.9 |
| Bubbles (number of bubbles/kg) | 0.2 | 0.31 | 0.25 | 0.20 | 5.5 | 0.46 | 0.23 |

EXAMPLES 2 TO 7

A sheet glass having a thickness as identified in Table 2 was prepared in the same manner as in Example 1 by adjusting the composition of the matrix glass components to be the same as in Example 1 so that $SiO_2:Al_2O_3:MgO:CaO:Na_2O:K_2O:SO_3$ would be 72.2:1.8:3.6:7.5:12.7:0.6:0.1, and the contents of iron, etc. would be as identified in Table 2. With respect to such a sheet glass, the optical properties and bubbles were measured, and the results are also shown in Table 2. Example 5 is a Comparative Example in which the composition of the matrix glass components was the same as in Example 1 except that $SO_3$ was changed to 0.02 wt %. Example 6 is another Comparative Example, in which the content of the total iron is larger than the content in the glass of the present invention, and the amount of bubbles is large.

As is evident from the above Examples, the glass of the present invention has low solar radiation and ultraviolet ray transmittance and high visible light transmittance. Further, the iron content is relatively small, whereby the change of the composition can be carried out in a short period of time, and the ratio of the weight of FeO calculated as $Fe_2O_3$ to the weight of the total iron calculated as $Fe_2O_3$ is relatively small, whereby bubbles are rather little, and control of the melting step of glass is easy.

EXAMPLE 8

After the preparation of the glass in Example 2, glass was prepared in the same manner, so that the total cerium calculated as $CeO_2$ would be 1 wt %, whereby reams formed on the surface of the glass sheet.

EXAMPLE 9

After the preparation of the glass in Example 2, the change of the composition was carried out to bring the composition to the composition of usual window glass i.e. the composition composed solely of the matrix glass components with the compositional proportions being the same as Example 1 so that $SiO_2:Al_2O_3:MgO:CaO:Na_2O:K_2O:SO_3$ would be 72.2:1.8:3.6:7.5:12.7:0.6:0.1, whereby it took about 90 hours. On the other hand, after preparing glass having a composition of matrix glass components which was the same as in Example 1, but the contents of iron, etc. were 0.59 wt % of $Fe_2O_3$, 0.78 wt % of the total iron calculated as $Fe_2O_3$, 0.6 wt % of the total cerium calculated as $CeO_2$ and 0.2 wt % of $TiO_2$, the change of the composition was carried out to glass composed solely of the matrix glass components, wherein the compositional proportions were the same as in Example 1, whereby it took about 150 hours. Thus, since the iron content is small in the glass of the present invention, the change of the composition can be carried out in a short period of time.

EXAMPLES 10 TO 18

Soda lime-silica glass having the total iron calculated as $Fe_2O_3$, $CeO_2$, $TiO_2$ and CoO incorporated in the amounts identified in the upper section of Table 3 as optical property-improving components to a matrix composition comprising 71 parts (parts by weight, the same applies hereinafter) of $SiO_2$, 1.7 parts of $Al_2O_3$, 12.3 parts of $Na_2O$, 0.5 part of $K_2O$, 8 parts of CaO, 3.5 parts of MgO and 0.6 part of $SO_3$, was prepared. The bivalent iron (in Table 3, referred simply as $Fe^{II}$) in the total iron was also identified in the same section.

In the preparation of the glass, the preliminarily formulated glass batch was put into a platinum pot of 300 cubic centimeters, and heated and melted in an electric furnace for vitrification. Then, the molten glass was cast on a stainless steel plate, and both sides of the formed sheet were polished to obtain a sheet glass having a thickness of 3.5 mm (5.0 mm in Examples 15, 16 and 18).

With respect to these sheets, the solar radiation transmittance $T_e$ the visible light transmittance (by light source A) $T_{Va}$, the ultraviolet ray transmittance $T_{UV}$, the transmittance of wavelength at 370 nm $T_{370}$, the dominant wavelength $D_W$ and the excitation purity $P_E$ were obtained, and the results are shown in the lower section of Table 3. Also with respect to the glass of Comparative Example (Example 17), such properties were obtained in the same manner, and they are shown also in Table 3.

The solar radiation transmittance and the visible light transmittance were determined by JIS R3106, the ultraviolet ray transmittance was determined by ISO 9050, and the dominant wavelength and the excitation purity were determined by JIS Z8722.

As is evident from Table 3, the glass of the present invention has a green color and has high visible light transmittance, low solar radiation transmittance and particularly low ultraviolet ray transmittance.

TABLE 3

|  |  | \multicolumn{9}{c}{Examples} |
|---|---|---|---|---|---|---|---|---|---|---|
|  |  | 10 | 11 | 12 | 13 | 14 | 15 | 16 | 17 | 18 |
| $Fe_2O_2$ | parts | 0.62 | 0.59 | 0.62 | 0.61 | 0.61 | 0.53 | 0.54 | 0.64 | 0.60 |
| $Fe^{11}$ | wt % | 31 | 34 | 32 | 33 | 32 | 33 | 32 | 35 | 35 |
| $CeO_2$ | parts | 1.27 | 1.5 | 1.55 | 1.3 | 1.4 | 1.20 | 0.90 | 0.54 | 1.23 |
| $TiO_2$ | parts | 0.4 | 0.45 | 0.35 | 0.4 | 0.4 | 0.40 | 0.40 | 0.32 | 0.31 |
| CoO | parts | 0.0009 | 0.0015 | 0.0017 | — | 0.0012 | — | — | — | — |
| $T_e$ | % | 48.2 | 46.8 | 47.2 | 47.8 | 47.9 | 42.1 | 43.4 | 46.7 | 45.5 |
| $T_{va}$ | % | 73.0 | 72.0 | 73.3 | 74.4 | 73.4 | 71.4 | 72.9 | 73.8 | 72.8 |
| $T_{UV}$ | % | 9.8 | 8.1 | 7.9 | 9.8 | 9.0 | 7.2 | 8.8 | 16.3 | 7.9 |
| $T_{370}$ | % | 28.2 | 24.5 | 24.3 | 28.1 | 26.4 | 21.5 | 26.4 | 41.5 | 24.0 |
| $D_w$ | nm | 521 | 519 | 525 | 528 | 525 | 519 | 519 | 506 | 519 |
| $P_e$ | % | 2.3 | 2.3 | 2.4 | 2.6 | 2.4 | 2.8 | 2.7 | 2.6 | 2.4 |

The glass for vehicles of the present invention has a slightly green color and has low solar radiation and ultraviolet ray transmittance and high visible light transmittance. Further, the iron content is relatively small, whereby the change of the composition can be completed in a short period of time, the productivity is accordingly high, and the amount of bubbles contained in the glass is very little. Further, the ratio of the weight of FeO calculated as $Fe_2O_3$ to the weight of the total iron calculated as $Fe_2O_3$ is relatively small, whereby refining can be accomplished without reducing the pressure, and the control of the melting step of the glass is simple.

Further, according to the second embodiment of the present invention, glass having a green color and having high visible light transmittance and low ultraviolet ray transmittance, particularly low transmittance of the wavelength of 370 nm, can be provided. Such glass is particularly suitable for windshield glass for automobiles.

What is claimed is:

1. Glass having low solar radiation and ultraviolet ray transmittance, which consists essentially of a soda lime-silica glass containing from 0.53 to 0.70 wt % of total iron calculated as $Fe_2O_3$, from 0.2 to 0.4 wt % of $TiO_2$ and from 0.4 to 0.8 wt % of total cerium calculated as $CeO_2$, wherein the weight of FeO calculated as $Fe_2O_3$ is from 30 to 40% of the weight of the total iron calculated as $Fe_2O_3$.

2. The glass according to claim 1, which has a thickness of from 1.7 to 2.6 mm, and wherein the total iron calculated as $Fe_2O_3$ is from 0.53 to 0.65 wt %, $Fe_2O_3$ is from 0.35 to 0.44 wt % and FeO is from 0.16 to 0.21 wt %.

3. The glass according to claim 1, which has a thickness of more than 2.6 mm and not more than 3.6 mm, and wherein the total iron calculated as $Fe_2O_3$ is from 0.60 to 0.70 wt %, $Fe_2O_3$ is from 0.39 to 0.50 wt %, and FeO is from 0.18 to 0.24 wt %.

4. The glass according to claim 1, which has a thickness of more than 3.6 mm and not more than 4.0 mm, and wherein the total iron calculated as $Fe_2O_3$ is from 0.55 to 0.67 wt %, $Fe_2O_3$ is from 0.37 to 0.46 wt %, and FeO is from 0.18 to 0.22 wt %.

5. The glass according to claim 1, which has a thickness of more than 4.0 mm and not more than 7.0 mm, and wherein the total iron calculated as $Fe_2O_3$ is from 0.53 to 0.65 wt %, $Fe_2O_3$ is from 0.35 to 0.44 wt %, and FeO is from 0.16 to 0.21 wt %.

6. The glass for architectural use according to claim 1, which has a thickness of from 1.7 to 7 mm.

7. The glass for vehicles according to claim 1, which has a thickness of from 1.7 to 5 mm.

8. Laminated glass prepared by laminating sheets of glass having low solar radiation and ultraviolet ray transmittance as defined in claim 1, said sheets of glass having a thickness of from 1.7 to 2.6 mm.

9. The glass according to claim 1, which has a thickness of from 1.7 to 4.4 mm, and wherein the total iron calculated as $Fe_2O_3$ is from 0.60 to 0.64 wt %, $Fe_2O_3$ is from 0.39 to 0.42 wt %, FeO is from 0.16 to 0.21 wt %, $TiO_2$ is from 0.2 to 0.4 wt %, the total cerium calculated as $CeO_2$ is from 0.4 to 0.6 wt %, and the weight of FeO calculated as $Fe_2O_3$ is from 30 to 35% of the weight of the total iron calculated as $Fe_2O_3$.

10. The glass according to claim 9, wherein said $TiO_2$ is present in an amount of from 0.27 to 0.4 wt. % and said total cerrium calculated at $CeO_2$ is present in an amount of from 0.47 to 0.8 wt. %.

11. The glass according to claim 1, which has a thickness of from 4.4 to 7.0 mm, and wherein the total iron calculated as $Fe_2O_3$ is from 0.57 to 0.61 wt %, $Fe_2O_3$ is from 0.37 to 0.42 wt %, FeO is from 0.15 to 0.20 wt %, $TiO_2$ is from 0.2 to 0.4 wt %, the total cerium calculated as $CeO_2$ is from 0.4 to 0.6 wt %, and the weight of FeO calculated as $Fe_2O_3$ is from 30 to 35% of the weight of the total iron calculated as $Fe_2O_3$.

12. The glass according to claim 11, wherein said $TiO_2$ is present in an amount of from 0.27 to 0.4 wt. % and said total cerrium calculated at $CeO_2$ is present in an amount of from 0.47 to 0.8 wt. %.

13. The glass according to claim 1, wherein said $TiO_2$ is present in an amount of from 0.27 to 0.4 wt. % and said total cerium calculated at $CeO_2$ is present in an amount of from 0.47 to 0.8 wt. %.

14. Glass having a green color and reduced transmittance of solar radiation and ultraviolet rays, said glass consisting essentially of a soda lime-silica glass containing from 0.53 to 0.70 weight % of total iron calculated as $Fe_2O_3$, from 0.2 to 0.4 weight % of $TiO_2$ and from 0.4 to 0.8 weight % of total cerium calculated as $CeO_2$, wherein the weight of FeO calculated as $Fe_2O_3$ is from 30 to 40% of the weight of the total iron calculated as $Fe_2O_3$, said glass having a dominant wavelength of from 500 to 515 nm, and, when measured at a thickness of 4 mm, a visible light transmittance of at least 70%, as measured using light source A, a solar radiation transmittance of not higher than 50%, as measured in accord with JIS R 3106, and an ultraviolet ray transmittance of not higher than 18%, as measured in accordance with IISO 950.

* * * * *